Patented Sept. 4, 1928.

1,683,442

UNITED STATES PATENT OFFICE.

RENÉ BOTSON, OF AUDERGHEM-BRUSSELS, BELGIUM, ASSIGNOR TO SOCIÉTÉ INDUSTRIELLE DES APPLICATIONS CHIMIQUES, SOCIÉTÉ ANONYME, OF BRUSSELS, BELGIUM.

PROCESS FOR PREPARING DEPILATORY SUBSTANCES.

No Drawing. Application filed August 19, 1926, Serial No. 130,341, and in Belgium August 21, 1925.

This invention relates to depilatory substances, and has for its object the provision of a product both efficient and very active though of no influence whatsoever upon the hair and skin. It is known that tanners make use, for stripping the hair off skins, either of lime water or of an alkaline sulphide, according to their aiming mainly at preservation of the hair or at preservation of the skin. Now, an inconvenience inherent to the use of lime lies in that the skins are readily spoiled and that necessarily measures are to be taken to avoid carbonatation of the reagent. On the other hand, the treatment by means of sulphide results in the destruction of hair, an outcome which, in many cases, is undesirable.

In applying the present invention, the product secured is entirely free from the disadvantage stated, a result obtained by solubilizing sodium sulphide or any other suitable sulphide through the action of dry steam and mixing therewith a solution of a caustic alkali and water. The liquid thus secured remains stable, and this will entitle us to assert that it is obtained by chemical combination rather than by mere mixing.

On the other hand, its depilatory effect obviously differs from that of its constitutive elements, for, besides the advantage of leaving both hair and skin unaltered, it operates so mildly as to be applicable to live animals or even to the human skin, being not detrimental to either of same.

By way of example, the process can be carried out as follows:

After having poured concentrated commercial sulphide of sodium into an absolutely tight autoclave fitted with a pressure-gauge and a valve for the escape of steam, dry steam will be let in until a liquid mass is obtained. In the event of too high a pressure inside the digester one will allow the steam to gently escape. Sodium sulphide is a product which contains impurities, amongst which ferrous sulphate and hyposulphite of sodium, the presence of which seems to facilitate dissolution. It should be noted that the sulphide used must not be wet in starting the treatment, and must get dissolved through the only action of steam, which latter must preferably have a minimum pressure of 4 to 5 atmospheres.

The substance collected when leaving the autoclave is of a dark colour, and, on its removal, there should be added to it 1 part per thousand of terpinolene or of any similar substance, i. e. of any solvent derived from the distillation of seashore-pine or of any like vegetals.

Terpinolene by a catalytic effect facilitates the precipitation of the impurities contained in commercial sulphide of sodium.

The resulting liquid will then be poured off into vats and then allowed to rest; the product obtained by decantation after 24 hours is then to be passed through a filter having very fine-woven meshes, wherefrom it will drop into another vat to be there mixed up with a solution of caustic soda which must be brought back to the same specific gravity as the liquid obtained, and in equal quantity to that of said liquid.

The mixture is then to be passed again through the filter, in order to avoid the slight green-coloured precipitation which could take place and impart the hides an objectionable colour.

Next thereto, the most important operation, that is to say, crystallization of the matter obtained, will be started and carried out as follows:

The liquid, having now a specific gravity of 14 to 20° Bé., will be poured into crystallizing pans made of a non-corrodible metal, said pans being provided with mechanical stirring devices, and is evaporated until a 50 per cent concentration is obtained, when crystallization takes place, whereafter the crystals should be centrifugally dried by means of a centrifugal apparatus, and this will render the product ready for sale.

In using the product for tannery purposes one should have the crystals dissolved in tepid water, next to which various baths, from 40° Bé. down to 0.01° should be prepared. As a fact, the degree of specific gravity is to vary according to the hides dealt with by the tanner, whether salt-treated or exotic, whether the operator has to deal with ox hides or calf skins. It should be noted, however, that the skins must be properly soaked prior to their being treated in the baths.

The baths thus obtained will keep their specific gravity even after having been used for treating hundreds of skins. As to the duration of soaking in the baths, this may vary from 2 up to 48 hours, according to the quality of said hides.

The hides can, thereafter, be entirely freed from hair which latter will be thus preserved. The skin will be freed from its fatty impurities and the flesh will be more easily scraped off, the swelling being at the same time obtained. As to the tanners desirous of obtaining neutral hides, they have simply to submit the hides, next to their treatment, to the action of a diluted acid bath.

The product secured can be utilized for any industrial purpose, such as the treatment of rabbit skins, sheep skins, horse tails, etc., and as above stated, it can be applied with advantage for toilet purposes, namely, for removal of any undesirable hair on any human skin. Of course, the proportions above mentioned can be modified in accordance with the purpose, and, for instance, whenever having to deal with human or with very fine skins, the proportion of caustic soda can be reduced. Moreover, one could employ, instead of caustic soda, any other alkaline soda, and the sulphide of sodium could be replaced by another alkaline sulphide, not to mention a number of other modifications that can be realized after this process without ever departing from the scope of the invention.

I claim:

1. A process for preparing a depilatory product from an alkali sulphide, comprising the treatment of the alkali sulphide with dry steam until liquefaction has taken place, and adding to the liquid thus obtained, after decantation and filtration, a solution of caustic soda, the solution obtained being afterwards filtered, concentrated and crystallized, substantially as described.

2. A process for preparing a depilatory substance from sulphide of sodium, comprising treating said sulphide of sodium with dry steam until liquefaction is obtained, then adding to the liquid, after decantation and filtration, a solution of caustic soda, then filtering, concentrating and crystallizing the liquid obtained, substantially as described.

3. A process for preparing a depilatory product from sulphide of sodium, comprising treating the sulphide of sodium with dry steam under pressure in a closed digester until liquefaction ensues, adding to the resulting liquid a small quantity of terpinolene to precipitate the impurities, adding after decantation and filtration a quantity of a solution of caustic soda equal to that of the liquid obtained and made up to the same specific gravity, filtering, concentrating and crystallizing the liquid obtained, substantially as described.

In testimony whereof I signed hereunto my name.

RENÉ BOTSON.